Patented Jan. 5, 1943

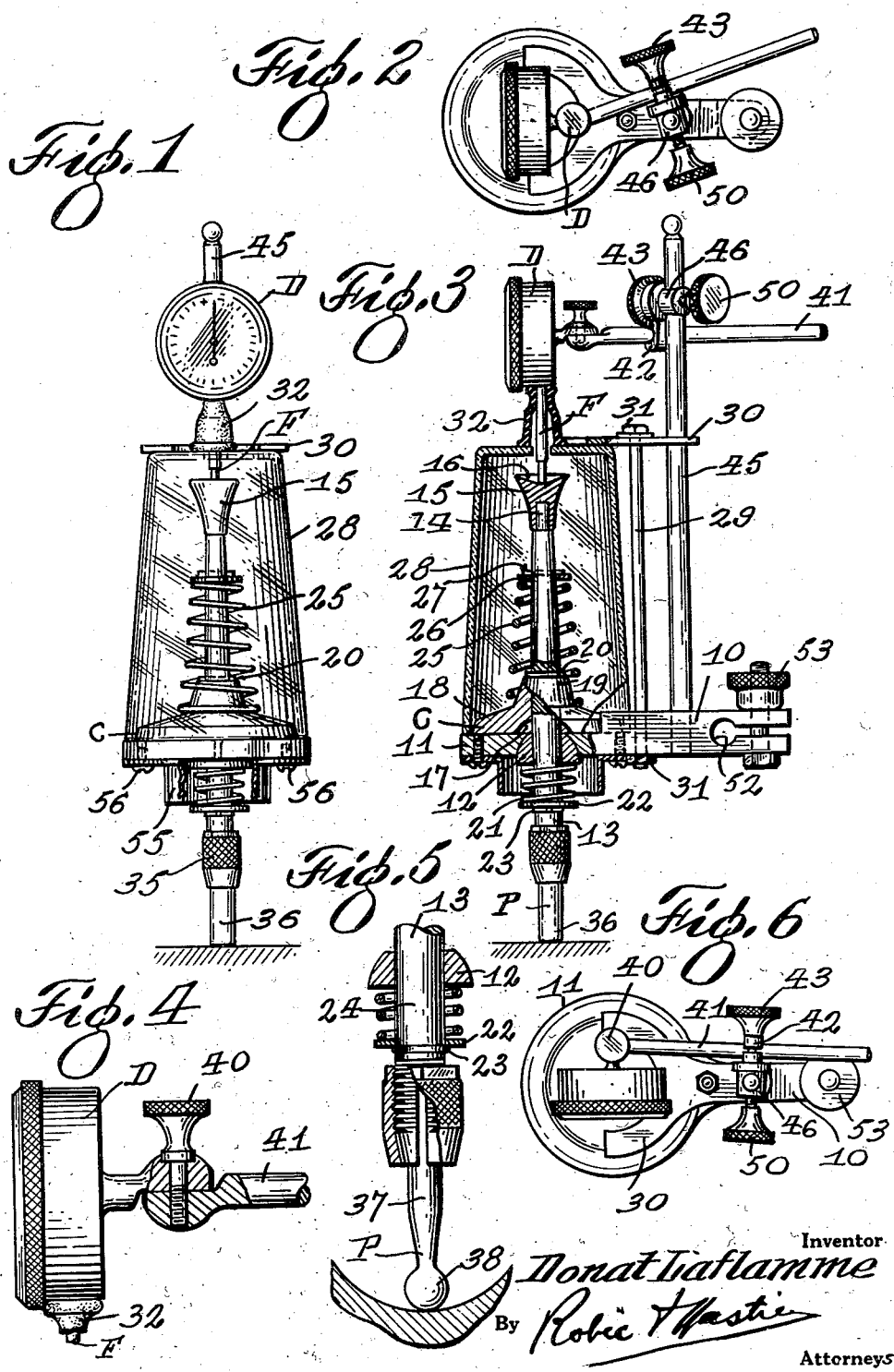
Jan. 5, 1943.     D. LAFLAMME     2,307,323
MEASURING INSTRUMENT
Filed Dec. 2, 1941

2,307,323

UNITED STATES PATENT OFFICE 2,307,323

MEASURING INSTRUMENT

Donat Laflamme, Montreal, Quebec, Canada

Application December 2, 1941, Serial No. 421,385

6 Claims. (Cl. 33—172)

The present invention relates to measuring instruments and, more particularly, to devices wherein size differentiations are shown directly on a dial indicator.

According to this invention, a measuring instrument is provided which is operable to detect size differences, in work-pieces, laterally as well as vertically from a single operating position.

The main object of the invention, therefore, resides in the provision of means for rendering a dial indicator sensitive to surface irregularities in a horizontal plane as well as in planes disposed angularly with respect to said horizontal plane.

Another important object is the provision of an instrument of the character described which performs the operations enumerated in a highly accurate manner.

A further object resides in the provision of means of the character described which are rugged, reliable and simple of operation for unskilled labor.

Finally, still another object concerns the provision of indicating means of the character described, which are relatively inexpensive to make.

Other objects and advantages of the invention will be further described, or become apparent, during the description to follow.

As an example, and for purposes of illustration, a preferred form of the invention is shown in the annexed drawing wherein:

Figure 1 is a front elevational view of the instrument according to the invention, Figure 2 is a top plan view thereof, Figure 3 is a side elevational view partly shown in section, Figure 4 is a side view of the dial indicator with the connecting means shown in section, Figure 5 is a partly sectional elevation view of the instrument chuck with feeler pin, and Figure 6 is a view similar to Figure 2 but showing the dial indicator in a different position.

Referring to the drawing, wherein similar reference characters represent corresponding parts throughout, the letter "D" represents a dial indicator of known construction and which is of current use in machine-shops and the like. Said indicator may be of conventional construction and calibrated in any desired manner, such as fractions of an inch or centimeters, as the case may be; inasmuch as the particular structure of this indicator is unimportant, it is not shown nor described in detail herein, and is simply represented in a conventional manner.

The mechanism about to be described is used to support the dial indicator and to transmit to the feeler F thereof vertical as well as lateral movement of the feeler pin P, which movement would be correctly registered on the dial of the indicator in the predetermined fraction of the unit chosen for measuring the work at hand.

The device is first composed of a base plate 10, of substantial thickness and size for purposes of rigidity, said base plate having a circular enlargement 11, of reduced thickness, and provided in the centre thereof with a rounded depression adapted to receive snugly therein a thick bushing 12 having an outer rounded surface of perfectly circular curvature defined between two flat parallel surfaces. This bushing 12 is further apertured centrally to receive a main shaft 13.

As shown to advantage in Figures 1 and 3, the shaft 13 is of uniform cross-section from the bottom thereof to approximately half its length, wherefrom it gradually tapers to a reduced portion 14 forming shoulder, and over which portion a cup 15 is pressed. Said cup has its upper surface depressed, from the edges thereof to the exact center, into the shape of an inverted cone to form a cavity 16, said surface being finely ground and adapted to receive the feeler shaft F of the dial indicator and the purpose of which will be explained later on.

Over the shaft 13, and above the base plate enlargement 11, a conical washer C is inserted, said washer having an under surface ground perfectly flat and recessed slightly in the exact center thereof, at 17, to prevent interference with the upper portion of the bushing 12. The upper surface of the washer is stepped and comprises a first surface 18, slightly inclined, and a second surface 19, rising sharply from said surface 18 to form a shoulder or collar used as a bearing for the shaft 13. As shown to advantage in Figures 1 and 3, the diameter of the washer C is slightly less than the outside diameter of the enlarged portion 11 of the base plate 10.

The downward position of the shaft 13, with respect to the washer C resting on the base plate 10, is determined by a transverse pin 20 inserted in said shaft at approximately half its length and extending slightly from diametrically opposed points thereof. The shaft is normally held in position against the washer C, and prevented from downward movement by said pin, through the intermediary of a coiled spring 21 disposed between the lower surface of the bushing 12, and a large washer 22 inserted over the lower portion of the shaft 13 and held in place by a split ring 23 retained in a circumferential groove 24 formed in the shaft. Thus, the tension of the spring 21 normally urges the shaft 13 downwardly against the stop constituted by the pin 20 resting on top of the washer C. In order to hold the washer C normally in contact with the base plate 10, a spring 25 is disposed over the portion 19 of said washer, resting on the surface 18, and held under slight compression by a washer 26 on the shaft 13 held in place by a pin 27; the spring 25 must be weaker than spring 21, in order to be held under tension by said last spring 21.

So as to exclude all possible dust from the finely ground surfaces of the mechanism just described, a dust cover 28, preferably of glass or other transparent material, is inverted over said mechanism on the base plate 10, around the washer C, and held in place by an end-threaded rod 29 passed at one end through the base plate 10 and, at the other end, through a retaining plate 30 disposed over the top portion of the cover 28. Proper tension is imparted to the plate 30 by screwing more or less the nut 31. To complete the dust-proofness of the apparatus, a rubber grommet or the like 32 is disposed between the indicator D and the upper surface of the cover 28, through which grommet the shaft F extends and into a central aperture at the top of said cover 28.

The measuring apparatus proper is completed by a chuck 35 disposed at the lower end of the shaft 13 and adapted to receive feeler pins of various shapes according to the work to be performed. In Figures 1 and 3, a straight feeler pin 36 is shown having a reduced neck for insertion through the jaws of the chuck while, in Figure 5, a feeler pin 37 is shown which includes a ball point 38 for better following curved surfaces or for indicating lateral irregularities.

The dial indicator is supported in place, and swiveled onto a transverse horizontal shaft 41, by means of thumb-screw 40, said shaft 41 being secured in turn to a split bracket 42 by means of thumb screw 43. The split bracket 42 is in turn fixedly secured to a vertical post 45 by means of a collar 46 retained in proper position on said vertical post by means of a screw 50. Thus, by means of the devices just described, the dial indicator may be turned at various angles and otherwise adjusted to suit the operator of the mechanism, so as to always rest with its shaft F in the exact center of the cup 15 when when the mechanism is at standstill.

The indicating device may be secured to a lathe, milling machine or other machine tools, by suitable means such as a rigid shaft inserted through the aperture 52 of the base plate and clamped by means of the screw 53.

The operation of the indicating mechanism is relatively simple, especially when vertical indications only are required. In this case, the upward movement imparted to the feeler 36 is transmitted directly through the shaft 13 to the feeler F thereby rendering the dial indicator directly operative to register the movement in fractions of the unit predetermined.

In the case of lateral movement, wherein the shaft 13 is angularly displaced, the fulcrum of the shaft 13 acting as a lever is constituted by the free underedge of the conical washer and the lateral movement translated into a vertical movement, registrable by the dial indicator, through the intermediary of the inclined surface of the cup 15.

The ball joint constituted by the bushing 12 acts to permit movement of the shaft in all directions and thereby renders the device sensitive to vertical as well as lateral movement.

In order to protect as much as possible the spring 21 from injury, a circular guard 55 is provided around said spring and secured to the under-surface of the base plate 10 by means of screws 56.

From the foregoing, it will be apparent that the present apparatus is a most useful addition to the tool-makers art as an indicating instrument adapted to register directly, in a variety of planes, the movement constituting surface variaions and serving also as a direct measurement of the size of said variations.

Inasmuch as ordinary dial indicators are sensitive in one direction only, the present device permits said indicators to be responsive also to movements in planes at right angles to the only plane normally affecting said dial indicators. The present mechanism is undoubtedly an advance of the art and a most useful instrument for the tool-makers, die-sinkers, machinists, etc.

It must be understood that various changes as to the size, shape and arrangement of parts may be resorted to without departing from the spirit of the invention, or the scope of the subjoined claims.

Having thus described my invention, I claim:

1. A measuring instrument comprising, in combination, a base, a centrally aperture tiltable washer resting on said base, a shaft in said aperture extending downwardly through the base, a stop on the shaft for determining the downward position of said shaft with respect to the washer, a main spring below the base for normally urging said stop against said washer, a conically depressed cup at the upper end of the shaft, and a dial indicator having a feeler shaft contacting said cup, whereby oscillatory movements of the shaft free end are translated by the indicator in predetermined values of distance.

2. In an instrument as claimed in claim 1, a ball joint in the base through which the shaft is passed.

3. In an instrument as claimed in claim 1, a second spring between the shaft and washer for urging said washer in contact with the base, said second spring being weaker than the main spring for urging the shaft against the washer.

4. In an instrument as claimed in claim 1, a dust cover over the base and enclosing washer, second spring, cup and the upper part of the shaft.

5. An instrument as claimed in claim 1, comprising a stop washer on the lower end of the shaft for retaining the main spring under tension between the ball-joint and said stop washer.

6. An instrument of the character described, comprising a base, said base having an aperture the lower portion of which is half-spherical, an apertured ball-like member seated in said aperture, a vertical shaft slidably fitted in the ball member and extending above and below the base, a large conical tiltable washer inserted over the shaft and resting above the base, a spring between said washer and the shaft for urging the washer against the base, a stop on the shaft for defining the downward position of said shaft with respect to the washer, a main spring between the lower end of the shaft and the underside of the ball member for maintaining the shaft stop on the washer against the tension of the washer spring, and a conically depressed cup at the upper end of the shaft for receiving the feeler of a dial indicator.

DONAT LAFLAMME.